United States Patent
Ryu et al.

(10) Patent No.: US 9,190,658 B2
(45) Date of Patent: Nov. 17, 2015

(54) LITHIUM ELECTRODE FOR LITHIUM METAL BATTERY AND METHOD OF MANUFACTURING THE LITHIUM ELECTRODE

(75) Inventors: Hee Yeon Ryu, Gyeonggi-do (KR); Yoon Ji Lee, Gyeonggi-do (KR); Hee Jin Woo, Gyeonggi-do (KR); Jun Ki Rhee, Gyeonggi-do (KR); Ki Chun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 247 days.

(21) Appl. No.: 13/561,464

(22) Filed: Jul. 30, 2012

(65) Prior Publication Data

US 2013/0295452 A1    Nov. 7, 2013

(30) Foreign Application Priority Data

May 2, 2012    (KR) .......................... 10-2012-0046330

(51) Int. Cl.
| | | |
|---|---|---|
| *H01M 10/05* | (2010.01) | |
| *H01M 4/134* | (2010.01) | |
| *H01M 4/1395* | (2010.01) | |
| *H01M 4/38* | (2006.01) | |
| *H01M 4/62* | (2006.01) | |
| *H01M 4/80* | (2006.01) | |
| *H01M 10/0562* | (2010.01) | |
| *H01M 10/42* | (2006.01) | |
| *H01M 4/66* | (2006.01) | |
| *H01M 10/052* | (2010.01) | |
| *H01M 4/02* | (2006.01) | |

(52) U.S. Cl.
CPC ............ *H01M 4/134* (2013.01); *H01M 4/1395* (2013.01); *H01M 4/382* (2013.01); *H01M 4/62* (2013.01); *H01M 4/80* (2013.01); *H01M 10/0562* (2013.01); *H01M 10/4235* (2013.01); *H01M 4/661* (2013.01); *H01M 10/052* (2013.01); *H01M 2004/027* (2013.01); *Y02E 60/122* (2013.01); *Y02T 10/7011* (2013.01); *Y10T 29/49115* (2015.01)

(58) Field of Classification Search
CPC ...................................................... H01M 4/04
See application file for complete search history.

(56) References Cited

U.S. PATENT DOCUMENTS

| | | | | |
|---|---|---|---|---|
| 2004/0219434 | A1* | 11/2004 | Benson et al. | 429/304 |
| 2008/0241698 | A1* | 10/2008 | Katoh | 429/319 |
| 2009/0202903 | A1* | 8/2009 | Chiang et al. | 429/203 |

FOREIGN PATENT DOCUMENTS

| | | |
|---|---|---|
| JP | 2006260887 A | 9/2006 |
| JP | 2009032429 A | 2/2009 |

(Continued)

OTHER PUBLICATIONS

Kanamura et al. "Three dimensionally ordered composite solid materials for all solid-state rechargeable lithium batteries" Journal of Power Sources 146 pp. 86-89 (2005)).*

*Primary Examiner* — Jacob Marks
(74) *Attorney, Agent, or Firm* — Mintz Levin Cohn Ferris Glovsky and Popeo, P.C.; Peter F. Corless

(57) ABSTRACT

Disclosed are a lithium electrode for a lithium metal battery, which uses a solid high-ionic conductor having a three-dimensional (3D) porous structure, wherein a lithium metal or lithium alloy is filled into each pore and dispersed, and a method for manufacturing the lithium electrode. By applying a solid high-ionic conductor having a 3D porous structure, an ion conduction path is secured in the lithium electrode using the solid high-ionic conductor instead of a conventional liquid electrolyte, electrical-chemical reactivity in charging and discharging are further improved, and shelf life and high rate capability are enhanced.

8 Claims, 1 Drawing Sheet

(56) References Cited

FOREIGN PATENT DOCUMENTS

| | | |
|---|---|---|
| JP | 2011018585 A | 1/2011 |
| KR | 10-1999-0055229 | 7/1999 |
| KR | 10-2002-0088417 | 11/2002 |
| KR | 10-2004-0096381 | 11/2004 |
| KR | 10-2009-0058517 | 6/2009 |
| WO | 2008021961 A2 | 2/2008 |

* cited by examiner

LITHIUM ELECTRODE FOR LITHIUM METAL BATTERY AND METHOD OF MANUFACTURING THE LITHIUM ELECTRODE

CROSS-REFERENCE TO RELATED APPLICATION

This application claims under 35 U.S.C. §119(a) the benefit of Korean Patent Application No. 10-2012-0046330 filed on May 2, 2012, the entire contents of which are incorporated herein by reference.

BACKGROUND (a) Technical Field

The present invention relates to a lithium electrode for a lithium metal battery and a method of manufacturing the lithium electrode. More particularly, the present invention relates to a lithium electrode for a lithium metal battery, which uses a solid high-ionic conductor having a three-dimensional ("3D") porous structure, and a method for manufacturing the lithium electrode.

(b) Background Art

Due to the high ionic conductivity of a solid electrolyte even at room temperature, much research has been focused on the development of a lithium metal battery which can utilize a solid electrolyte instead of a liquid electrolyte. However, when a solid electrolyte is applied to an electrode in the form of powder, the interfacial resistance between an electrode active material and the solid electrolyte increases. Therefore, there is a need to reduce the interfacial resistance between the electrode active material and the solid electrolyte, which is used in an electrode such as a positive electrode ("cathode") of a lithium ionic battery. In an attempt to reduce the resistance and improve performance, an oxide-based film has been formed on the surface of the electrode active material.

However, particularly in the case of a lithium metal battery, in which lithium metal is used as a negative electrode ("anode"), securing an ion conduction path in the lithium electrode continues to be an issue.

SUMMARY OF THE DISCLOSURE

The present invention has been made in an effort to solve the above-described problems associated with prior art, and provides a lithium electrode for a lithium metal battery and a method of manufacturing the lithium electrode. In particular, rather than a conventional liquid electrolyte, a solid high-ionic conductor structure having a 3D porous structure is used for securing an ion conduction path, and lithium metal or lithium alloy is filled and dispersed in each pore. As such, shelf life of the lithium metal battery is increased and an ion conduction path of lithium is secured. As used herein, the terms "fill", "filling", "filled" and the like, when used to refer to the lithium metal or lithium alloy in the pores, refer not only to completely filling the pores, but also refer to partially filling the pores to any extent.

In one aspect, the present invention provides a lithium electrode for a lithium metal battery, the lithium electrode including a solid high-ionic conductor having a 3D porous structure, a lithium metal or lithium alloy filled in each open pore of the 3D porous structure, and a collector coupled onto the surface of the solid high-ionic conductor.

According to various embodiments, a reaction activating material may be coated onto an interface between the solid high-ionic conductor and the lithium metal to improve interfacial reaction. The reaction activating material may in some embodiments be selected from the group consisting of aluminium (Al), indium (In) metal, $Al_2O_3$, $ZrO_2$, ceramic materials and combinations thereof.

In another aspect, the present invention provides a method of manufacturing a lithium electrode for a lithium metal battery, the method including manufacturing a solid high-ionic conductor as a 3D porous structure, filling a lithium metal or lithium alloy in each open pore of the 3D porous structure, and coupling a collector onto a surface of the solid high-ionic conductor having the lithium metal or lithium alloy filled into each pore.

According to various embodiments, an average pore size of the solid high-ionic conductor is in a range of about 0.01-50 μm, and its porosity is in a range of about 30-90%.

According to various embodiments, the solid high-ionic conductor is manufactured from one or more materials selected from the group consisting of LiSICON ($\gamma$-$Li_3PO_4$ derivative), Thio-LiSICON ($Li_3.25Ge0.25P0.75S4$ derivative), NaSiCON ($NaZr_2P_3O_{12}$ derivative), Perovskite ($La_{2/3}Li_{1/3}TiO_3$ derivative), Garnet ($Li_5La_3M_2O_{12}$, M=Ta,Nb derivative), LiPON, LiPOS, LiSON, and LiSIPON.

According to various embodiments, the solid high-ionic conductor is manufactured as a 3D porous structure by using any suitable method. For example, the 3D porous structure may be formed by using a colloidal crystal template method, a carbon template method, a freeze casting method, an aerogel synthesis method, or a tape casting method.

According to various embodiments, the lithium metal or lithium alloy is filled into each pore of the solid high-ionic conductor by using any suitable method. For example, the lithium metal or lithium alloy is filled into each pore by using a melting method which melts lithium or lithium of the lithium alloy and fills the lithium in a pressurizing or depressurizing manner, a thin film coating method which uses metal deposition (e.g. chemical vapor deposition (CVD) and physical vapor deposition (PVD)), a powder particle paste filing method which fills lithium powder in a paste form, and an extracting method which inserts lithium ion liquid and extracts the lithium ion liquid as metal.

According to various embodiments, the method may further include coating a reaction activating material onto an interface between the solid high-ionic conductor and the lithium metal so as to improve interfacial reaction. Suitable reaction activating materials can, for example, be selected from the group consisting of aluminium (Al), indium (In) metal, $Al_2O_3$, $ZrO_2$, ceramic materials and mixtures thereof.

Other aspects and preferred embodiments of the invention are discussed infra.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
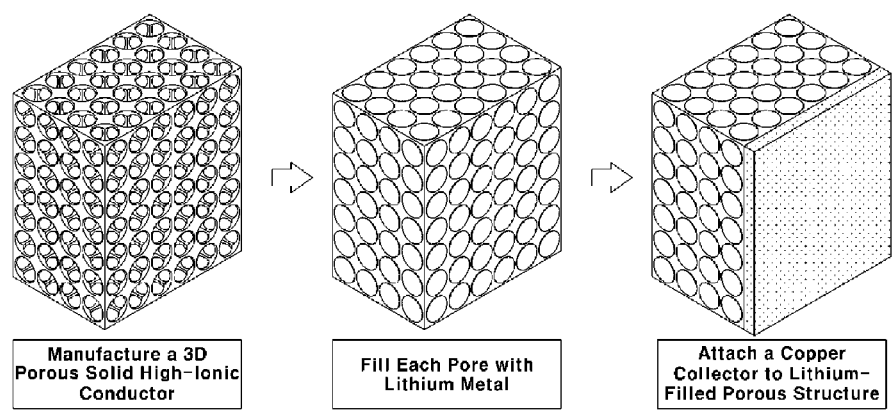
FIG. 1 is a diagram showing a lithium electrode for a lithium metal battery according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings to allow those of ordinary skill in the art to easily carry out the present invention. While the invention will be described in conjunction with the exemplary embodiments, it will be understood that present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The present invention provides a solid high-ionic conductive lithium electrode, particularly an anode, in a new form, in which a solid high-ionic conductor is used in place of a conventional liquid electrolyte. In particular, the solid high-ionic conductor has a 3D porous structure, wherein lithium or lithium alloy is filled in the pores of the 3D porous solid high-ionic conductor to thereby provide a lithium metal battery with increased shelf life, improve output characteristics, and secure ionic conductivity of lithium in charging and discharging.

Figure 2:
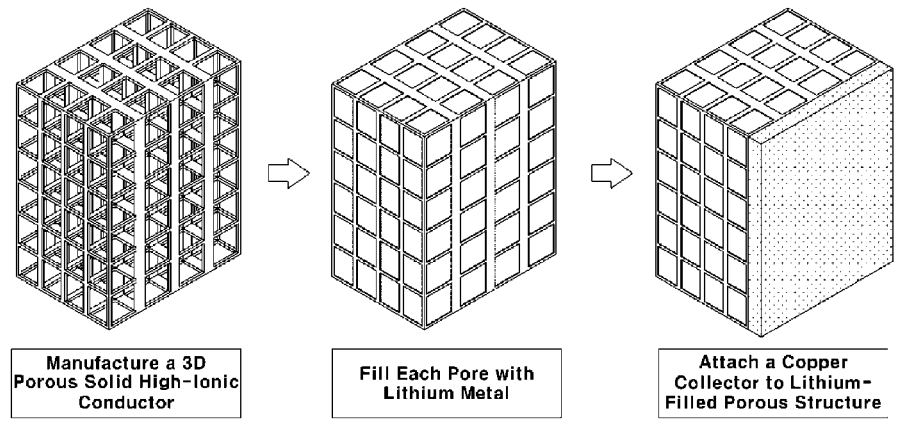
FIG. 2 is another diagram showing a lithium electrode for a lithium metal battery according to the present invention.

FIGS. 1 and 2 show exemplary structures of a porous solid high-ionic conductor for manufacturing a lithium electrode, particularly an anode, for a lithium metal battery according to the present invention.

As shown, each pore is formed as an open pore. While it is, of course, possible to form a portion of the pores as open pores and a portion as closed pores, it is preferable that all pores are formed as open pores for subsequent filling with lithium. The shape of each pore is not particularly limited, and may be spherical as shown in FIG. 1, isotropic as shown in FIG. 2, or any other variety of shapes. The size of each pore can be set to be an optimal size according to the thickness of the lithium electrode. For example, in some embodiments the average pore size is preferably in a range of about 0.01-50 μm which can maximize interfacial reactivity between lithium and the high-ionic conductor in the pore. The set pore size can be based on a lithium usage rate of 25-50% taking into consideration contact area and reactivity between lithium and the solid high-ionic conductor.

The porosity of the solid high-ionic conductor may also be set so as to take into account minimum application of the high-ionic conductor for securing ion conductivity while using lithium to a maximum amount, and also so as to provide mechanical stability based on the application. For example, according to a preferred embodiment, the porosity is set in a range of about 30-90%.

As shown in the figures, the solid high-ionic conductor having the 3D porous structure can be manufactured as an ordered pore structure (i.e., uniformly distributed pores throughout) so as to secure a desired ion conductivity. However, the 3D porous structure may also be designed as an irregular and non-ordered porous structure (i.e., a structure having irregular, non-uniform pore arrangement) which can provide increased porosity for filling with lithium and, thus, may maximize the amount of lithium metal which can be used.

According to embodiments of the present invention, the solid high-ionic conductor can be formed from a variety of suitable materials and, for example, may include a sulfide-based structure and an oxide-based structure, more specifically, a crystalline structure and an amorphous structure such as LiSICON ($\gamma$-$Li_3PO_4$ derivative), Thio-LiSICON ($Li_{3.25}Ge_{0.25}P_{0.75}S_4$ derivative), NaSiCON ($NaZr_2P_3O_{12}$ derivative), Perovskite ($La_{2/3}Li_{1/3}TiO_3$ derivative), Garnet ($Li_5La_3M_2O_{12}$, M=Ta,Nb derivative), LiPON, LiPOS, LiSON, and LiSIPON.

Further, a variety of methods can be used to manufacture the solid high-ionic conductor as a 3D porous structure. For example, a colloidal crystal template method, a carbon template method, a freeze casting method an aerogel synthesis method, a tape casting method, or the like may suitably be used.

The colloidal crystal template method and the carbon template method are particularly useful to facilitate ordering and size adjustment of each pore of the 3D porous structure. The freeze casting method allows for growth of the conductor in a rod form and further facilitates ordering of pores between rods. The aerogel synthesis method may be used to provide high porosity, such as porosity of 95% or higher, with each pore being formed in a nano size.

Any variety of methods can be suitably used to fill lithium in each pore of the 3D porous structure of the solid high-ionic conductor. For example, a lithium or lithium alloy melting method, a thin-film coating method, or a powder particle paste filling method may be used.

These filling methods are known and can be carried out by the present invention in accordance with the known procedures. For example, the melting method is generally carried out by melting lithium or lithium of lithium alloy and filling the melted lithium in a pressurizing or depressurizing manner. The thin film coating method uses metal deposition, such as chemical vapor deposition (CVD) and physical vapor deposition (PVD), to fill the lithium. The powder particle paste filing method fills lithium powder in a paste form. The extracting method inserts lithium ion liquid in the pores and extracts it as metal. Further, a reaction activating material (e.g. Al, indium (In) metal, $Al_2O_3$, $ZrO_2$, ceramic, etc.) may be coated on the interface (interface between the solid high-ionic conductor and lithium metal, particularly the inner surface forming the pores) in the form of an ultrathin film to improve interfacial reaction.

After lithium metal is filled into each pore of the 3D porous structure, a metal collector is coupled onto the surface of the solid high-ionic conductor. The collector can be coupled through any suitable method, such as through thin-film coating or using a binder. The metal collector may also be coupled prior to lithium metal filling. The collector is preferably formed with any material having electric conductivity, such as metals (copper, nickel, etc.) and carbons.

The present invention is preferably carried out so as to uniformly fill lithium or lithium alloy in each pore of the 3D porous solid high-ionic conductor. Of course, it is also possible to fill only a portion of the pores of the 3D porous solid high-ionic conductor, and/or to fill the pores in a non-uniform manner. The pores can be filled by any suitable method, such as the previously described melting method, thin film coating method, powder particle paste filing method, and extracting method, to thus manufacture the lithium electrode. The present invention secures an ion conduction path in the lithium electrode, improves electrical-chemical reactivity in charging and discharging, and further increases shelf life and high rate capability.

Hereinafter, the following Examples are intended to illustrate the present invention without limiting its scope.

Example 1

$La_2O_3$(powder)+$Li_2CO_3$(powder)+$TiO_3$(powder) were mixed, ground and then sintered at high temperature of 1350° C. to obtain an oxide-based high-ionic conductor ($La_{2/3}Li_{1/3}TiO_3$). The powder was prepared with an average particle size of 500 nm or less.

Dispersed polystyrene beads a few micrometers in size were provided, mixed with ethanol (i.e., a dispersion solvent) and an oxide-based high-ionic conductor, dispersed by ultrasonication and dried. Then, polystyrene was removed therefrom using methylene dichloride, followed by heat treatment at a high temperature (a temperature of 300° C.) to obtain a 3D porous structure (10×10×0.7 mm) having open pores, in which the porosity was 70% and a average pore size was about 1.7 µm.

Then $Al_2O_3$ was coated on the interface in the form of an ultrathin film by PVD (Physical Vapour Deposition) with substrate temperature at 700° C. Even though there was a thickness gradient of a 3D porous structure, the thickness of the $Al_2O_3$ coating was less than 10 nm from TEM investigation. Because the solid high-ionic conductor (3D porous structure) reacts with lithium, the reaction is prevented by adding the $Al_2O_3$ coating step with nano-size thickness between interfaces.

Next, a depressurization-induced method was carried out to fill the pores in the 3D porous structure. First, the manufactured 3D porous structure was mounted on a lithium melting device installed in a chamber in an argon atmosphere, lithium metal was melted at 300° C., and the melted lithium metal was filled in the 3D porous structure.

Finally, copper was sputtering-coated on the surface of the thus formed high-ionic conductor having the lithium-filled 3D porous structure to form a collector, thereby manufacturing a lithium metal electrode having lithium filled in the 3D porous structure.

Example 2

An oxide-based high-ionic conductor ($La_{2/3}Li_{1/3}TiO_3$) was prepared in the same manner as in Example 1 as a 3D porous structure (10×10×0.7 mm) having open pores, in which the porosity was 65% and an average pore size was about 2.5 µm.

Then $Al_2O_3$ was coated on the interface in the form of an ultrathin film by PVD (Physical Vapour Deposition) with substrate temperature at 700° C. Even though there was a thickness gradient of a 3D porous structure, the thickness of the $Al_2O_3$ coating was less than 10 nm from TEM investigation. Because the solid high-ionic conductor (3D porous structure) reacts with lithium, the reaction is prevented by adding the $Al_2O_3$ coating step with nano-size thickness between interfaces.

Then, each pore of the 3D porous structure manufactured as described above was filled with lithium metal by placing the structure in the argon-gas atmosphere and coating the pores with a paste formed by mixing a few micrometers of lithium particles and a binder.

As in Example 1, a copper collector was attached onto the surface of the high-ionic conductor having the lithium-filled 3D porous structure, thereby manufacturing a lithium electrode.

Example 3

An oxide-based high-ionic conductor ($La_{1.3}Al_{0.3}Ti_{1.7}(PO_4)_3$) was provided as a fine powder having an average particle size of 500 nm or less. Then, a 3D porous structure (10×10×0.7 mm) having open pores was prepared in the same manner as in Example 1, to provide a porosity of 65% and a pore size of about 3.3 µm.

Then $Al_2O_3$ was coated on the interface in the form of an ultrathin film by PVD (Physical Vapour Deposition) with substrate temperature at 700° C. Even though there are thickness gradient of a 3D porous structure. The thickness of the $Al_2O_3$ coating was less than 10 nm from TEM investigation. Because the solid high-ionic conductor (3D porous structure) reacts with lithium, the reaction is prevented by adding the $Al_2O_3$ coating step with nano-size thickness between interfaces.

Lithium metal was then filled into each pore of the 3D porous structure using the same melting method as in Example 1.

As in Example 1, a copper collector was attached onto the surface of the high-ionic conductor having the lithium-filled 3D porous structure, thereby manufacturing a lithium electrode.

Example 4

As in Example 3, an oxide-based high-ionic conductor ($La_{1.3}Al_{0.3}Ti_{1.7}(PO_4)_3$) was provided as a fine powder having an average particle size of 500 nm or less, and the same method as in Example 1 was carried out to prepare a 3D porous structure (10×10×0.7 mm) having open pores, in which the porosity was 65% and an average pore size of about 6 μm.

Then $Al_2O_3$ was coated on the interface in the form of an ultrathin film by PVD (Physical Vapour Deposition) with substrate temperature at 700° C. Even though there are thickness gradient of a 3D porous structure. The thickness of the $Al_2O_3$ coating was less than 10 nm from TEM investigation. Because the solid high-ionic conductor (3D porous structure) reacts with lithium, the reaction is prevented by adding the $Al_2O_3$ coating step with nano-size thickness between interfaces.

In an argon-gas atmosphere, a paste formed by mixing lithium particles of a few micrometers in size and a binder was coated onto each pore of the 3D porous structure, thereby filling lithium metal into the pore.

As in Example 1, a copper collector was attached onto the surface of the high-ionic conductor having the lithium-filled 3D porous structure, thereby manufacturing a lithium electrode.

Comparative Example

A liquid electrolyte (1M $LiCF_3SO_3$/0.5M LiTFSI+DME [1,2-Dimethoxyethane, anhydrous, 99.5%]) was applied onto the surface of a lithium metal foil (10×10×0.7 mm) used as an anode of a conventional lithium metal battery, thereby manufacturing a lithium electrode.

Test Example

Reaction surface areas with respect to the above lithium electrodes according to Examples 1-4 and the lithium electrode according to Comparative Example were compared. The results are shown in Table 1 below.

TABLE 1

| Item | Electrolyte | Porosity of Solid Electrolyte in Electrode | Pore Size of Solid Electrolyte in Electrode | Reaction Surface Area of Lithium Metal |
|---|---|---|---|---|
| Example 1 | $La_{2/3}Li_{1/3}TiO_3$ | 70% | 1.7 μm | 172941 mm² |
| Example 2 | $La_{2/3}Li_{1/3}TiO_3$ | 65% | 2.5 μm | 109200 mm² |
| Example 3 | $La_{1.3}Al_{0.3}Ti_{1.7}(PO_4)_3$ | 65% | 3.3 μm | 82727 mm² |
| Example 4 | $La_{1.3}Al_{0.3}Ti_{1.7}(PO_4)_3$ | 65% | 6 μm | 45500 mm² |
| Comparative Example | 1M $LiCF_3SO_3$/0.5M LiTFSI + DME[1,2-Dimethoxyethane, anhydrous, 99.5%] | X | X | 100 mm² |

As shown in the above Table 1, reaction surface areas of the lithium electrodes according to Examples 1-4 are superior to that in the Comparative Example. In particular, the lithium electrode according to Example 1, which was manufactured to have a 3D porous structure using the oxide-based high-ionic conductor $La_{2/3}Li_{1/3}TiO_3$, (i.e., a porosity of 70% and a pore size of about 1.7 μm) exceeding the lithium electrodes according to Examples 2-4 in reaction surface area.

According to the present invention, a solid high-ionic conductor having a 3D porous structure is manufactured, and lithium is filled into each pore in various ways to manufacture a lithium electrode. Unlike in a conventional lithium electrode in which reactions occur on the lithium metal electrode surface of the lithium metal battery (e.g., using a liquid electrolyte) which degrades reactivity, the present invention secures a high-ionic conduction path having a lithium-filled porous structure such that the reaction may occur inside the pores in addition to the surface of the lithium electrode. As such, the present invention improves the charging and discharging cycle characteristics and output characteristics of a lithium metal battery.

While exemplary embodiments of the present invention have been described in detail, the protection scope of the present invention is not limited to the foregoing embodiments and it will be appreciated by those skilled in the art that various modifications and improvements using the basic concept of the present invention defined in the appended claims are also included in the protection scope of the present invention.

What is claimed is:

1. A method of manufacturing a lithium electrode for a lithium metal battery, the method comprising:
    providing a template with a solid high-ionic conductor;
    removing the template to form the solid high-ionic conductor as a 3D porous structure;
    filling a lithium metal or lithium alloy in a plurality of open pores of the 3D porous structure; and
    coupling a collector onto a surface of the solid high-ionic conductor,
    wherein the 3D porous structure is designed as an irregular and non-ordered porous structure,
    wherein a reaction activating material is coated onto an interface between the solid high-ionic conductor and the lithium metal or lithium alloy to improve interfacial reaction, and the reaction activating material is coated on the interface by physical vapor deposition (PVD).

2. The method of claim 1, wherein the lithium metal or lithium alloy is filled in each of the plurality of open pores.

3. The method of claim 1, wherein a pore size of the solid high-ionic conductor is in a range of about 0.01-50 μm, and a porosity of the solid high-ionic conductor is in a range of about 30-90%.

4. The method of claim 1, wherein the solid high-ionic conductor is manufactured with any one or more materials selected from the group consisting of LiSICON, Thio-LiSICON, NaSiCON, Perovskite, Garnet, LiPON, LiPOS, LiSON, and LiSIPON.

5. The method of claim 1, wherein the solid high-ionic conductor is manufactured with any one or more materials selected from the group consisting of a $\gamma$-$Li_3PO_4$ derivative, a $Li_{3.25}Ge_{0.25}P_{0.75}S_4$ derivative, a $NaZr_2P_3O_{12}$ derivative, a $La_{2/3}Li_{1 1/3}TiO_3$ derivative, and a $Li_5La_3M_2O_{12}$ (M=Ta,Nb) derivative.

6. The method of claim 1, wherein the solid high-ionic conductor is manufactured as the 3D porous structure by using a method selected from the group consisting of a colloidal, crystal template method, a carbon template method, a freeze casting method an aerogel synthesis method, and a tape casting method.

7. The method of claim 1, wherein the lithium metal or lithium alloy is filled into the pores of the solid high-ionic conductor by using a method selected from the group consisting of a melting method which melts lithium or lithium of the lithium alloy and fills the lithium in a pressurizing or depressurizing manner, a thin film coating method which uses metal deposition, a powder particle paste filing method which fills lithium powder in a paste form, and an extracting method which inserts lithium ion liquid and extracts the lithium ion liquid as metal.

8. The method of claim 1, wherein the reaction activating material is selected from the group consisting of aluminium (Al), indium (In) metal, Al2O3, ZrO2, ceramic, and combinations thereof.

* * * * *